ved by such a reactivation treatment, a further
UNITED STATES PATENT OFFICE 2,206,226

PROCESS OF PREPARING A CADMIUM METAPHOSPHATE CATALYST

Walter Henry Groombridge and Thomas Pride Dee, Spondon, near Derby, England, assignors to Celanese Corporation of America, a corporation of Delaware No Drawing. Application July 8, 1936, Serial No. 89,684. In Great Britain August 2, 1935

2 Claims. (Cl. 252—228)

This invention relates to a process of preparing a cadmium metaphosphate catalyst.

The hydration of acetylene by subjecting this compound to reaction with steam in presence of a solid catalyst has in recent years been the subject of a considerable amount of research as a result of which numerous catalysts have been proposed. The value of any particular catalyst depends on a number of factors, including the life of the catalyst, the yield of useful products, which are chiefly acetaldehyde possibly together with some crotonaldehyde, based on acetylene used, the conversion based on the acetylene passed in contact with the catalyst and the temperature at which optimum results are obtained.

It has been found that when working with cadmium-phosphoric acid compounds as catalysts these factors are very largely dependent on the form in which the catalyst is employed, and that it is possible to obtain a catalyst of this type which will operate effectively over a considerable period of time while giving an exceptionally good yield of acetaldehyde and conversion even at a high rate of passage of the acetylene, and which, moreover, gives optimum results at relatively low temperatures of the order of 250 to 350° C.

The present invention concerns the production of a cadmium phosphate which gives results as a catalyst, particularly in the hydration of acetylene, which are much superior to those given by other cadmium phosphates. The catalyst of the invention consists of cadmium metaphosphate in the form of a compact mass of microscopic particles.

The cadmium meta-phosphate is prepared from phosphoric acid (or a substance yielding phosphoric acid) and a cadmium compound, and in this connection it is to be noted that best results are obtained by adding the required amount of phosphoric acid to a thin cream of finely powdered cadmium carbonate and water (for instance, 1 part by weight of cadmium carbonate to about 2 parts of water). The temperature at which the reagents are mixed should be such as to avoid the growth of large crystals, since the fine structure of the resulting product would thus be impaired, with the result that a less active catalyst would be obtained. In this connection it has been found most beneficial to heat a cadmium carbonate cream such as that referred to above to a temperature of 60–80° C. before adding phosphoric acid, which should be introduced slowly and with efficient stirring. After introduction of the phosphoric acid the mixture is evaporated to a pasty mass while continuing stirring, and then finally dried in an oven at 250–350° C., after which the dried product may be broken up into pieces of a size suitable for introduction into the catalyst chamber to be employed.

The properties of the catalyst mass may be enhanced by means of a sintering treatment effected by heating to incipient fusion. One very important result of the sintering treatment is that it increases very considerably the life of the catalyst, so that it may, with suitable intervals for reactivation, be employed for as much as 3–4 times as long as a similar catalyst which has not been subjected to the sintering treatment, before disintegration of the catalyst renders it unfit for further use. The sintering treatment may also enhance the actual activity of the catalyst, more particularly in the hydration of acetylene when dealing with a gas mixture containing but low percentages e. g. 5–10% of this gas.

When carefully prepared in the manner above described the catalyst consists, as previously indicated, of a compact mass of microscopic particles of cadmium meta-phosphate. The particles in a highly active catalyst according to the invention should be of less than 0.01 mm. diameter, while a catalyst consisting substantially of particles of 0.02 mm. or more diameter is considerably less active.

It is preferable to employ a catalyst produced by evaporating to dryness, e. g. in an iron vessel, a solution of cadmium meta-phosphate, sintering the dry residue and breaking the product up into pieces of a suitable size for introduction into the reaction zone. The presence of foreign substances is liable to have a marked effect on the properties of the catalyst.

In effecting the hydration of acetylene by means of the novel catalyst a mixture of steam and acetylene may be passed over the catalyst contained, for instance, in an iron tube. As above indicated it is possible by means of the invention to obtain excellent results at temperatures of 250 to 300° C., but higher temperatures, e. g. up to 350° C., may be employed if desired. Reactivation of the catalyst may be effected when the yield begins to show signs of falling, and can be carried out very effectively by blowing a current of air over the hot catalyst for a period of 1 to 3 hours. When the catalyst shows serious falling off in activity, and is not fully revived by such a reactivation treatment, a further improvement may be effected by removing the catalyst from the reaction zone, sieving it free from dust and then returning it for re-use after it has been subjected to reactivation with air.

The amount of steam employed may be varied within wide limits, but may generally be equal to about 2 to 15 times the volume of the acetylene. The strongly exothermic nature of the reaction permits the use of the larger quantities of steam without rendering necessary the external application of considerable quantities of heat. The reaction mixture may be preheated to the temperature at which the reaction is to be carried out before bringing the reaction mixture into contact with the catalyst.

The acetylene employed may be pure or may be diluted with other gases. In this connection it is to be noted that an important feature of the present invention is that it renders possible an efficient hydration of the acetylene contained in commercial gas mixtures, such as are obtained in the cracking of hydrocarbons and which contain but low percentages of acetylene, e. g. less than 10%, without previously separating or concentrating the acetylene. Preferably the diluting gases should be hydrogen or hydrocarbons, such as methane.

While the invention has been described with particular reference to the hydration of acetylene it may also be applied to the vapor-phase hydration of other hydrocarbons e. g. of the acetylene or ethylene series.

The following examples illustrate the invention:

Example 1

516 parts (by weight) of finely powdered cadmium carbonate are made into a cream with 1000 parts of water. The mixture is heated to 70° C. in a copper vessel and 665 parts of phosphoric acid ($H_3PO_4$, sp. gr. 1.75) are slowly added with efficient stirring. When all the phosphoric acid has been added the mixture is evaporated to a pasty mass, the stirring operation being continued throughout this evaporation. The product is then dried in an oven at 300° C., broken into pieces of a size suitable for use in the subsequent catalytic process, and the pieces subjected to a sintering treatment by heating in an iron vessel to the point of incipient fusion.

Example 2

A mixture of acetylene and hydrogen containing 7.6% of acetylene is passed together with steam over the catalyst prepared in Example 1 and maintained at a reaction temperature of 250 to 260° C.

The rates of passage of the acetylene-hydrogen mixture and of the steam are about 1200 and 650 litres per litre of catalyst per hour respectively.

Using a catalyst prepared in the manner given in Example 1 but omitting the sintering step, the conversion and yield obtained are somewhat lower.

Example 3

Pure acetylene and steam are passed over a catalyst prepared as in Example 1 at a temperature of 350° C., the rates of passage of acetylene and steam being 600 and 1200 litres per hour per litre of catalyst respectively.

Having described our invention, what we desire to secure by Letters Patent is:

1. Method of producing a cadmium phosphate catalyst, which comprises producing cadmium meta-phosphate as a compact mass of microscopic particles by slowly adding ortho-phosphoric acid to a thin cream of finely powdered cadmium carbonate in water, maintained at 60–80° C., the acid and carbonate being employed in about the proportions needed to form the acid cadmium ortho-phosphate $Cd(H_2PO_4)_2$, evaporating to a pasty mass, efficient stirring being maintained during the addition of the phosphoric acid and subsequent evaporation, heating the product to 250–350° C. to dry it and form the meta-phosphate and subjecting the meta-phosphate to a sintering treatment.

2. A cadmium phosphate catalyst containing as the sole active constituent cadmium meta-phosphate in the form of a compact sintered mass consisting substantially of precipitated microscopic particles having a diameter of less than 0.01 mm.

WALTER HENRY GROOMBRIDGE.
THOMAS PRIDE DEE.